Sept. 20, 1971    L. C. POLLOCK    3,606,382
TRUCK TAIL GATE STEPS
Filed March 14, 1969

INVENTOR
LLOYD C. POLLOCK
BY
Kent + Ade
ATTORNEY

United States Patent Office 3,606,382
Patented Sept. 20, 1971

3,606,382
TRUCK TAIL GATE STEPS
Lloyd C. Pollock, Box 66, Vermillion Bay,
Ontario, Canada
Filed Mar. 14, 1969, Ser. No. 807,170
Int. Cl. B60r 3/02
U.S. Cl. 280—166                                    1 Claim

ABSTRACT OF THE DISCLOSURE

Folding steps attached to a truck tail gate and linked to the frame so that when the tail gate is lowered the steps unfold and when the tail gate is raised the steps fold up flush with the outer surface of the tail gate.

The invention relates to new and useful improvements in truck tail gate steps, particularly tail gates used on trucks which may be adapted to carry detachable trailer campers.

These trailer campers on open pickup trucks are extremely popular but the height of the tail gate from the ground necessitates the use of some form of box or step when parked as the rear door of the camper faces the rear of the truck.

The present device overcomes the need for separate boxes or steps inasmuch as it consists of one or two steps secured between the tail gate and the bumper which automatically extend into position as the tail gate is lowered and retracted to storage position as the tail gate is raised without affecting the operation of the tail gate in any way.

The principal object of the invention therefore is to provide a device of the character herewithin described which can consist of either one step or two and which can extend and retract with the opening and closing of the tail gate respectively, it being understood that the tail gate opens to a horizontal position.

Another object of the invention is to provide a device of the character herewithin described which is simple in construction, economical in manufacture, and otherwise well suited to the purpose for which it is designed.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying figures in which.

In the drawings like characters of reference indicate corresponding parts of the different figures.

Figure 2:
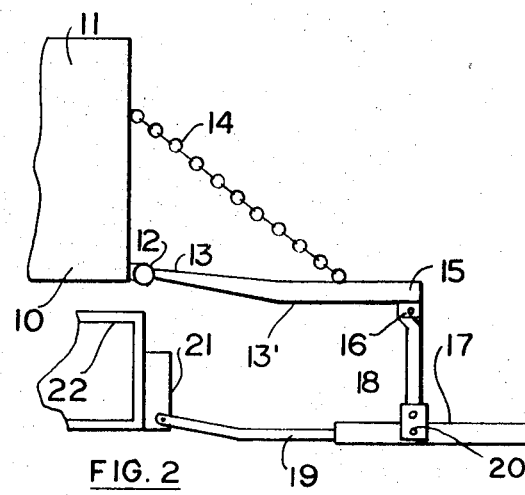
FIG. 2 is a view similar to FIG. 1 but with the tail gate in the open or horizontal position.
Figure 3:
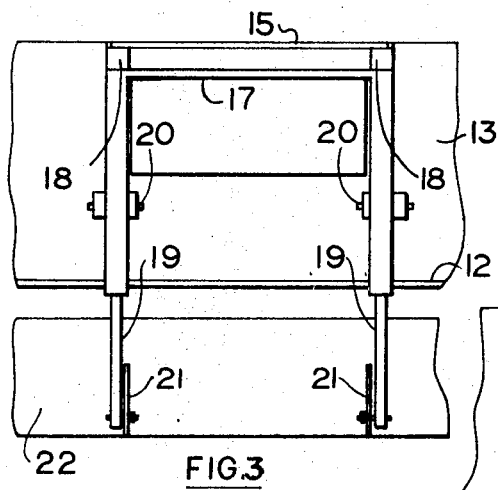
FIG. 3 is an end view of FIG. 1.

Proceeding therefore to describe the invention in detail, reference character 10 illustrates generally the rear end of the body of an open pickup truck in which 11 is the side panel, 12 is the lower transverse hinge and 13 is the conventional tail gate which may include check chains or similar devices 14 to maintain the tail gate in the horizontal position shown in FIG. 2 when the tail gate is in the open position.

Figure 6:
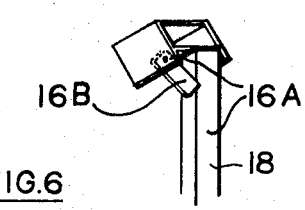
FIG. 6 is an enlarged fragmentary view of the attachment lugs to the tail gate.

Secured adjacent the upper transverse rail 15 of the tail gate, is a pair of lugs 16 having pins 16A by which arms 18 are pivotally secured. Alternatively, straps 16B may be used as shown in FIG. 6 extending from arms 18.

A planar step 17 is pivotally secured to these arms 18 adjacent the lower ends thereof by means of brackets 20 as shown.

Adjustable telescopic links or arms 19 extend between the rear of the step 17 and brackets 21 secured to the rear bumper 22 of the truck.

When the tail gate is lowered to the position shown in FIG. 2, the links 19 force the step to move through 90° so that when the tail gate is in the position shown in FIG. 2, the step 17 is horizontal and is maintained against any downward movement by means of the links 18, 19 and check chains 14. The telescopic arms 19 are pre-adjusted and locked in a pre-adjusted position so that the step 17 when lowered is horizontal.

Figure 1:
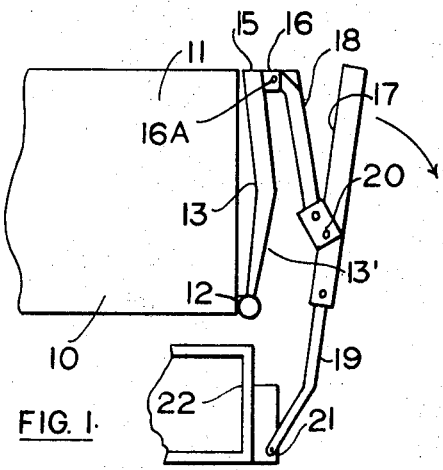
FIG. 1 is a partially schematic side elevation of the rear end of a pickup truck with the tail gate in the raised but partially opened position and showing a one step system.

As the tail gate is raised, the arms 18 swing towards the tail gate so that the device takes up the position shown in FIG. 1.

Figure 4:
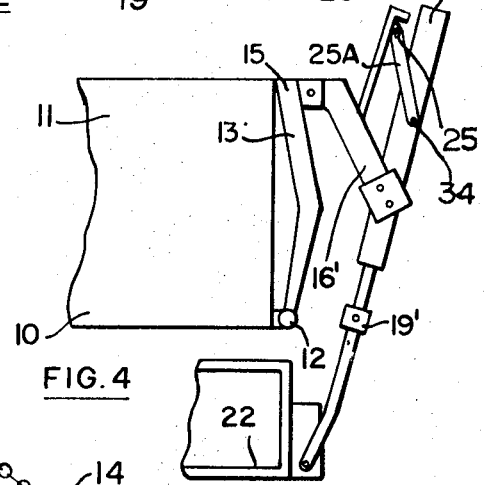
FIG. 4 is a view similar to FIG. 1 but showing the preferred embodiment of the device which includes two steps.
Figure 5:
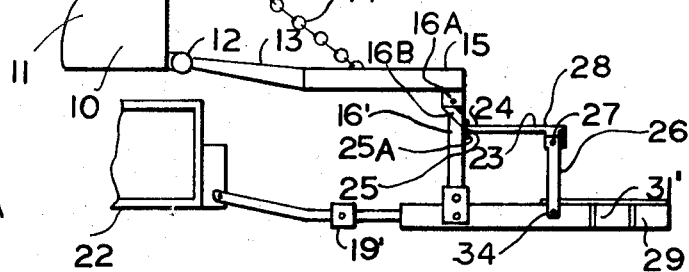
FIG. 5 is a view similar to FIG. 2 but with the embodiment of FIG. 4 therein.

FIGS. 4 and 5 show the preferred embodiment which includes a pair of steps.

In this embodiment, a pair of links or arms 16' are pivotally secured to or adjacent to the upper transverse rail 15 of the tail gate 13 by lugs 16 and pins 16A as hereinbefore described.

A first or upper step 23 is pivotally secured between the arms 16' by the rear end 24 thereof. This pivotal connection may take the form of pins 25 extending through lugs 25A on the arms 16' and through lugs (not illustrated) formed on the rear edge 24 of the step. Alternatively, of course, a pivot rod can extend from one side or the other between the links or arms 16'.

Intermediate links or arms 26 are pivotally secured by pivot pins 27 to the front side 28 of the step 23 and these links are pivotally secured by the other ends thereof to lugs 29 formed on the rear side 30 of a second or lower step 31 as clearly shown in FIG. 5.

Figure 7:
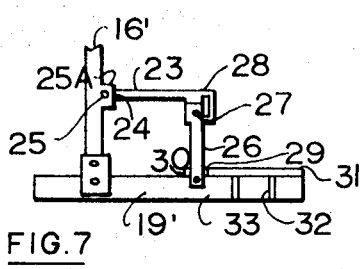
FIG. 7 is an enlarged fragmentary side view of the step mounting of FIG. 5.

This step 31 is secured by a clip 32 to the ends 33 of telescopically adjustable links 19' which are similar to the telescopic adjustable link 19 described in the previous embodiment (FIG. 7 shows these details).

Alternatively, the arm 19' may be secured to the rear of an integral lower step 31' shown in FIGS. 4 and 5 under which circumstances the lower ends of links or arms 26 are pivotally secured intermediate the front and rear sides of this step as shown by reference character 34.

In operation of this preferred embodiment, as the tail gate 13 swings downwardly to the horizontal position shown in FIG. 5, the telescopic links 19 force the steps and links to take up the position shown in FIG. 5 and to remain in this position until they are folded upwardly to the position shown in FIG. 4, it being understood that this showing in FIG. 4 has been expanded slightly for clarity. In effect, the links overlap one another and the adjustable links 19' lie substantially parallel to the tail gate and in close proximity therewith.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

What is claimed to be the present invention is:

1. The combination of a vehicle including a hinged tail gate which is swingable from a closed vertical position to an open horizontal position, and a folding step attachment comprising a pair of transversely spaced arms pivoted to said vehicle at points below said tail gate for vertical swinging movement of the arms, a step member supported by said arms, and a pair of links pivoted at one end thereof to said arms and at their other end to said tail gate whereby said step member may be lowered from an upwardly folded position to an operative position when the tail gate is opened, said attachment being characterized in that said arms comprise slidably telescoped sections and means for locking the same in an adjusted position so that the said step member is horizontally disposed when in its operative position.

References Cited

UNITED STATES PATENTS

| 1,169,794 | 2/1916 | Fuller | 182—95 |
| 1,223,639 | 4/1917 | Swartsel | 296—62 |

LEO FRIAGLIA, Primary Examiner

R. R. SONG, Assistant Examiner

U.S. Cl. X.R.

296—62